(12) United States Patent
Li et al.

(10) Patent No.: US 6,353,691 B1
(45) Date of Patent: Mar. 5, 2002

(54) METHOD AND SYSTEM FOR SPLITTING OR COMBINING OPTICAL SIGNAL

(75) Inventors: Wei Zhong Li, San Jose; Yanfeng Yang, Sunnyvale, both of CA (US)

(73) Assignee: Oplink Communications, Inc., San Jose, CA (US)

(*) Notice: Subject to any disclaimer, the term of this patent is extended or adjusted under 35 U.S.C. 154(b) by 0 days.

(21) Appl. No.: 09/492,966

(22) Filed: Jan. 27, 2000

(51) Int. Cl.$^7$ .................................................. G02B 6/00
(52) U.S. Cl. .............................. 385/11; 385/11; 385/34; 359/495
(58) Field of Search .................. 359/495, 496, 359/497; 385/33, 34, 11, 48, 31

(56) References Cited

U.S. PATENT DOCUMENTS

| | | | |
|---|---|---|---|
| 4,650,289 A | | 3/1987 | Kuwahara .................... 350/375 |
| 5,291,571 A | * | 3/1994 | Kunikane et al. |
| 5,909,310 A | | 6/1999 | Li et al. ...................... 359/484 |
| 6,205,270 B1 | * | 3/2001 | Cao |

* cited by examiner

*Primary Examiner*—Hung N. Ngo
(74) *Attorney, Agent, or Firm*—Sawyer Law Group LLP

(57) ABSTRACT

A method and system for providing a splitter/combiner is disclosed. The splitter/combiner includes a first birefringent wedge having a first optic axis and a first wedge angle and a second birefringent wedge having a second optic axis and a second wedge angle. The second birefringent wedge is optically coupled with the first birefringent wedge. The second wedge angle is complementary to the first wedge angle. The second optic axis is perpendicular to the first optic axis such that an extraordinary signal for the first birefringent wedge is an ordinary signal for the second birefringent wedge. The first and second birefringent wedges establish a first path for a first portion of a first optical signal and establish a second path for a second portion of the first optical signal. The first path and the second path are separated by an angle. The first optical signal travels from the first birefringent wedge to the second birefringent wedge. The first birefringent wedge and the second birefringent wedge also combine a second optical signal travelling along the first path with a third optical signal travelling along the second path. The second optical signal and the third optical signal travel from the second birefringent wedge to the first birefringent wedge.

15 Claims, 3 Drawing Sheets

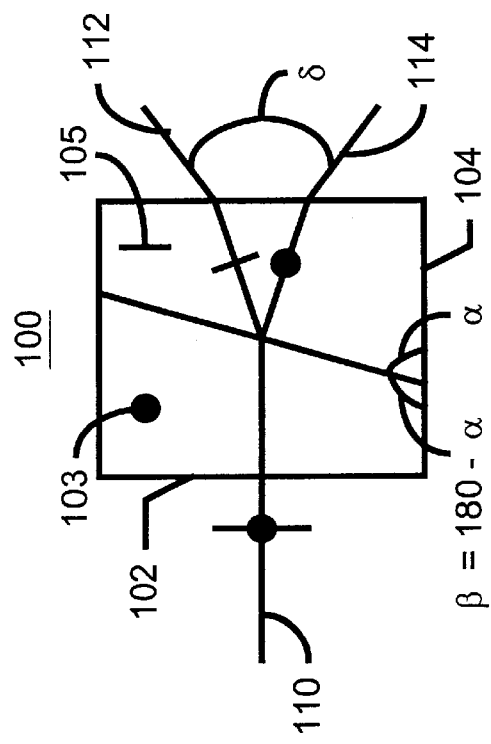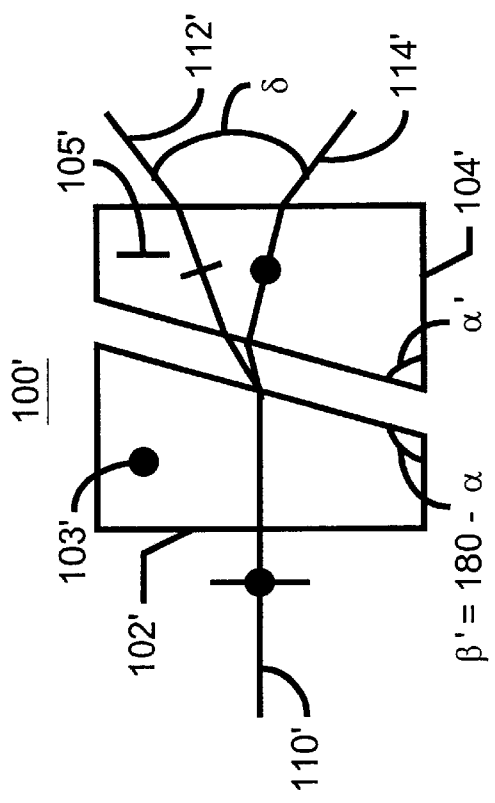

METHOD AND SYSTEM FOR SPLITTING OR COMBINING OPTICAL SIGNAL

FIELD OF THE INVENTION

The present invention relates to optical technology, and more particularly to a method and system for splitting or combining an optical signal.

BACKGROUND OF THE INVENTION

Conventional optical signals are often desired to be split or combined based on the polarization of the signal. In order to perform either of these functions, a conventional splitter/combiner is often used. FIG. 1 depicts a conventional splitter/combiner 10. The conventional splitter/combiner 10 includes fiber 12 at one end and fibers 36 and 46 at the opposite end. The fibers 36 and 46 are polarization-maintaining fibers. Consequently, an optical signal travelling over one of the fibers 36 and 46 will maintain its polarization. The conventional splitter/combiner 10 includes collimators 13, 30 and 40 for collimating the optical signals carried on fibers 12, 36 and 46, respectively. Each conventional collimator 13, 30 and 40 typically includes a capillary 14, 34 and 44, respectively. The capillaries 14, 34 and 44 hold each fiber 12, 36 and 46, respectively. The collimators 13, 30 and 40 also include lenses 16, 32 and 42, respectively. The lenses 16, 32 and 42 are used in conjunction with the capillaries 14, 16 and 44, respectively, for collimating the optical signals carried on fibers 12, 36 and 46, respectively.

The conventional splitter/combiner 10 also includes a large birefringent crystal 20. A birefringent crystal has the property that light polarized in one direction ("ordinary signal") is deflected based on a different index of refraction than light polarized in a second, perpendicular direction ("extraordinary signal"). Any unpolarized optical signal can represented by an optical signal polarized in two perpendicular directions. Here, the optical signal can be decomposed into two portions polarized in the plane of the page and out of the plane of the page. The birefringent crystal 20 is oriented so that one portion of the optical signal polarized in out of the plane of the page and perpendicular to the optic axis 21 ("conventional ordinary signal") is transmitted undeflected. The birefringent crystal 20 also deflects a remaining portion of the optical signal polarized in another direction ("conventional extraordinary signal"). FIG. 1 depicts the conventional ordinary signal 24 and the conventional extraordinary signal 22 traveling through the birefringent crystal 20. As depicted in FIG. 1, the ordinary signal is polarized in a direction perpendicular to the optic axis 21 of the birefringent crystal 20. Furthermore, as depicted in FIG. 1, the optical signal enters the birefringent crystal 20 in a direction perpendicular to the face of the birefringent crystal 20. Thus, the angle of incidence of the optical signal, measured from a direction perpendicular to the face of the birefringent crystal 20, is zero degrees.

The conventional splitter/combiner 10 splits the optical signal input at the fiber 12 into two signals, based on the polarization of the signals. The signal from the input fiber 12 is collimated by the collimator 13 and transmitted to the birefringent crystal 20. The birefringent crystal 20 splits the input signal to the conventional ordinary signal 24 and the conventional extraordinary signal 22. Because of the orientation of the birefringent crystal 20 with respect to the collimator 13 and the direction of the optic axis 21, the conventional extraordinary signal 22 is transmitted at an angle, while the conventional ordinary signal 24 is transmitted undeflected. Thus, at the end of the birefringent crystal 20 closer to the fibers 36 and 46, the conventional ordinary signal 24 and the conventional extraordinary signal 22 are separated by a distance. The conventional ordinary signal 24 and the conventional extraordinary signal 22 are output from the birefringent crystal 20 in parallel. The conventional extraordinary signal 22 is provided to collimator 30 and output over polarization-maintaining fiber 36. Similarly, the conventional ordinary signal 24 is transmitted to the collimator 40 and output over the polarization-maintaining fiber 46.

When the conventional splitter/combiner 10 is to combine signals, the signals are input at fibers 36 and 46. The polarizations of the input signals provided over the fibers 36 and 46 are preferably that of the conventional extraordinary signal 22 and conventional ordinary signal 24, respectively. Because of the orientation of the birefringent crystal 20, the conventional extraordinary signal 22 and conventional ordinary signal 24 are combined. The combined signal is then transmitted to the collimator 13 and output via the fiber 12. Thus, the conventional splitter/combiner 10 can thus split or combine optical signals.

Although the conventional splitter/combiner 10 functions, one of ordinary skill in the art will readily recognize that the conventional splitter/combiner 10 is large and expensive. The birefringent crystal 10 is made large to develop a sufficient space between the conventional ordinary signal 24 and the conventional extraordinary signal 22. Furthermore, multiple collimators 13, 30 and 40 for the fibers 12, 36 and 46 consume space. The birefringent crystal is also costly due to its size. Furthermore, the number of components, such as the use of three collimators 13, 30 and 40 also add to the cost of the conventional splitter/combiner 10. The conventional splitter/combiner 10 is, therefore, large and expensive.

Accordingly, what is needed is a system and method for providing a splitter/combiner that is smaller and less expensive. The present invention addresses such a need.

SUMMARY OF THE INVENTION

The present invention provides a method and system for providing a splitter/combiner. The splitter/combiner comprises a first birefringent wedge having a first optic axis and a first wedge angle and a second birefringent wedge having a second optic axis and a second wedge angle. The second birefringent wedge is optically coupled with the first birefringent wedge. The second wedge angle is complementary to the first wedge angle. The second optic axis is perpendicular to the first optic axis such that an extraordinary signal for the first birefringent wedge is an ordinary signal for the second birefringent wedge. The first and second birefringent wedges establish a first path for a first portion of a first optical signal and establish a second path for a second portion of the first optical signal. The first path and the second path are separated by an angle. The first optical signal travels from the first birefringent wedge to the second birefringent wedge. The first birefringent wedge and the second birefringent wedge also combine a second optical signal travelling along the first path with a third optical signal travelling along the second path. The second optical signal and the third optical signal travel from the second birefringent wedge to the first birefringent wedge.

According to the system and method disclosed herein, the present invention provides a splitter/combiner which can be made smaller and more cheaply than conventional splitter/combiners.

BRIEF DESCRIPTION OF THE DRAWINGS

FIG. 2A depicts a simplified diagram of one embodiment of a splitter/combiner in accordance with the present invention.

FIG. 2B depicts a simplified diagram of an alternate embodiment of a splitter/combine in accordance with the present invention.

DETAILED DESCRIPTION OF THE INVENTION

Figure 1:
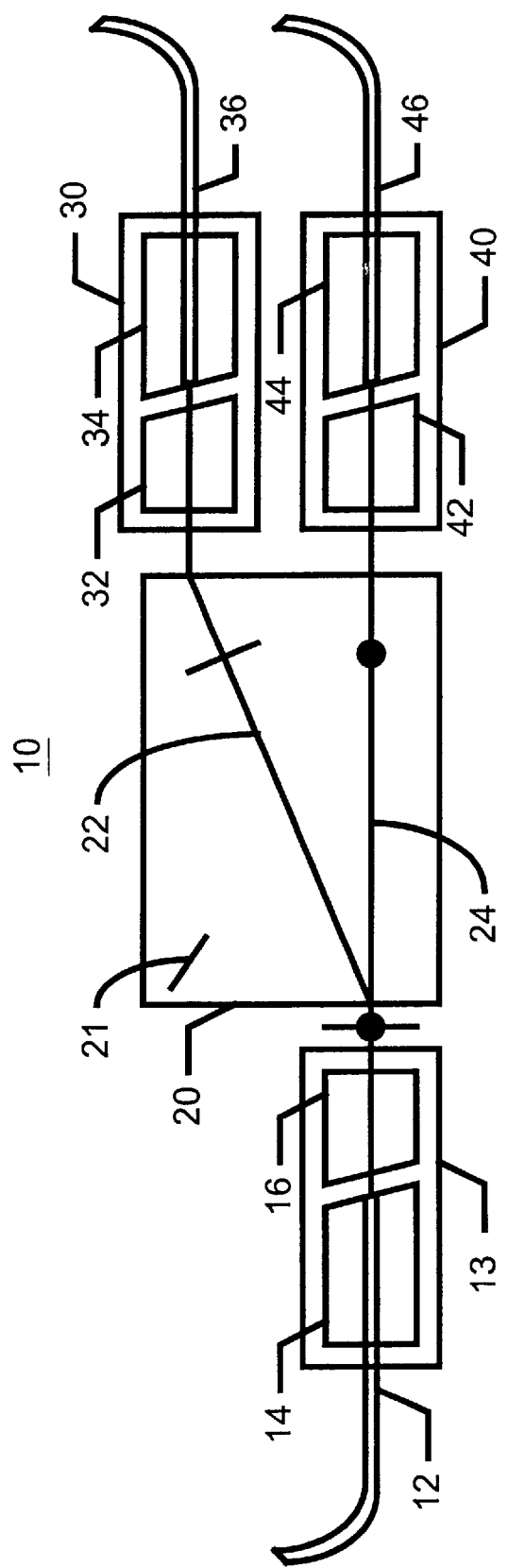
FIG. 1 is a diagram of a conventional splitter/combiner.

The present invention relates to an improvement in optical technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional optical signals are often desired to be split or combined based on the polarization of the signal. In order to perform either of these functions, a conventional splitter/combiner is often used. A conventional splitter/combiner typically has three fibers, a single fiber at one end, and two polarization-maintaining fibers at the opposite end. Each fiber is typically held in a holder, or capillary. The single fiber is used as an input fiber when the input signal is to be split. The two polarization-maintaining fibers are used as input fibers when the input signals are to be combined. The two polarization-maintaining fibers are so named because these fibers maintain the polarization of optical signals travelling over them. In a conventional splitter/combiner, each fiber has a collimator associated with it. A large birefringent crystal is also typically used and resides between the collimator for the single fiber and the two collimators for the two polarization-maintaining fibers. The birefringent crystal splits an optical signal from the single fiber into two optical signals based on the polarization of the optical signal. Typically, the optical signal can be broken into components polarized in two perpendicular directions. Furthermore, the optical signal typically enters the birefringent crystal with an angle of incidence that is zero degrees. The birefringent crystal transmits undeflected a portion of the optical signal into a portion that is polarized perpendicular to the optic axis of the birefringent crystal ("conventional ordinary signal"). The remaining portion of the optical signal ("conventional extraordinary signal"), which is polarized in the same plane as the optic axis, is deflected. The birefringent crystal is large enough to allow a large space to develop between the conventional ordinary signal and the conventional extraordinary signal. The large space allows the two collimators and the two polarization-maintaining fibers to be placed in parallel for the conventional splitter/combiner. Thus, an optical signal from the single fiber can be split. Similarly, a conventional ordinary signal and a conventional extraordinary signal from the polarization maintaining fibers can be combined by the conventional splitter/combiner and provided to the single fiber.

Although the conventional splitter/combiner functions, one of ordinary skill in the art will readily recognize that the conventional splitter/combiner is large. The birefringent crystal is large because a sufficient space must be provided between the conventional ordinary signal and the conventional extraordinary signal. Furthermore, multiple collimators for the fibers consume space. The conventional splitter/combiner is also relatively expensive. The high cost of the conventional splitter/combiner is due to the large size required for the birefringent crystal and the number of components, such as the use of three collimators.

The present invention provides a method and system for providing a splitter/combiner. The splitter/combiner comprises a first birefringent wedge having a first optic axis and a first wedge angle and a second birefringent wedge having a second optic axis and a second wedge angle. The second birefringent wedge is optically coupled with the first birefringent wedge. The second wedge angle is complementary to the first wedge angle. The second optic axis is perpendicular to the first optic axis such that an extraordinary signal for the first birefringent wedge is an ordinary signal for the second birefringent wedge. The first and second birefringent wedges establish a first path for a first portion of a first optical signal and establish a second path for a second portion of the first optical signal. The first path and the second path are separated by an angle. The first optical signal travels from the first birefringent wedge to the second birefringent wedge. The first birefringent wedge and the second birefringent wedge also combine a second optical signal travelling along the first path with a third optical signal travelling along the second path. The second optical signal and the third optical signal travel from the second birefringent wedge to the first birefringent wedge.

The present invention will be described in terms of splitter/combiner having specific components having a specific configuration. Similarly, the present invention will be described in terms of splitter/combiner components having specific relationships, such as distances or angles between components. However, one of ordinary skill in the art will readily recognize that this method and system will operate effectively for other components having similar properties, other configurations, and other relationships between components.

To more particularly illustrate the method and system in accordance with the present invention, refer now to FIG. 2A, depicting a simplified diagram of one embodiment of a splitter/combiner 100 in accordance with the present invention. The splitter/combiner 100 includes a first birefringent wedge 102 and a second birefringent wedge 104. The birefringent wedges 102 and 104 are preferably made of birefringent crystals. The first birefringent wedge 102 has an optic axis 103, while the second birefringent wedge 104 has an optic axis 105. The optic axis 103 is perpendicular to the optic axis 105 of the second birefringent wedge. Thus, a signal having its polarization perpendicular to the optic axis 103 ("ordinary signal") may have its polarization in the same plane as the optic axis 105 ("extraordinary signal"). The second birefringent wedge has a wedge angle, $\alpha$. The first birefringent wedge has a wedge angle, $\beta$, that is preferably the complement of $\alpha$.

Also depicted in FIG. 2A are optical paths 110, 112 and 114. The preferred polarizations for the optical signals over the paths 110, 112, and 114 are also depicted. The optical signal travelling over the path 110 is preferably unpolarized. Thus, the optical signal travelling over the path 110 can be decomposed into two polarizations, one perpendicular to the plane of the page and one in the plane of the page. In addition, both polarizations are perpendicular to the direction propagation of the optical signal on the path 110. The polarizations preferred for optical signals travelling over the paths 112 and 114 are also depicted. The optical signal travelling toward the birefringent wedges 102 and 104 over the path 110 can be split by the splitter/combiner 100 into two optical signals travelling from the birefringent wedges 102 and 104 over paths 112 and 114. Similarly, the splitter/combiner 100 can combine two optical signals travelling toward the birefringent wedges 102 and 104 over the paths 112 and 114 into a single optical signal travelling from the birefringent wedges 102 and 104 over the path 110.

If the optical signal is input to the splitter/combiner 100 over the path 110 is input to the splitter/combiner 100, the optical signal will have a zero degree angle of incidence with the first birefringent wedge 102. The portions of the optical signal travelling over the path 110 are polarized parallel to and perpendicular to the optic axis 103 and are both transmitted undeflected. This occurs because the portion of the optical signal on path 110 polarized in the plane of the page is the ordinary signal for the birefringent wedge 102. The portion of the optical signal on the path 110 polarized out of the plane of the page is transmitted undeflected because the polarization is parallel to the optic axis 103. Thus, the optical signal is transmitted undeflected in the first birefringent wedge 102.

When exiting the first birefringent wedge 102 and when entering the second birefringent wedge 104, the optical signal has a nonzero angle of incidence. The angle of incidence is defined with respect to a normal to a surface. Thus, the angle of incidence of the optical signal on the path 110 with the back face of the birefringent wedge 102 is 90-α, or β. The portions of the optical signal polarized perpendicular to and in the plane of the page thus have nonzero angle of incidence with the birefringent wedge 104. Thus, the optical signal on the path 110 is split into two portions travelling over paths 112 and 114. The first portion of the optical signal that travels over the path 112 is polarized in the plane of the page and is deflected. The second portion of the optical signal travelling over the path 114 is polarized perpendicular to the plane of the page and is thus the ordinary signal for the birefringent wedge 104.

However, because the portions of the signal travelling on the paths 112 and 114 exit the birefringent wedge 102 and impact the birefringent wedge 104 at a nonzero angle of incidence, both are deflected when exiting the birefringent wedge 102 and by the second birefringent wedge 104. Although both the ordinary signal that travels on the path 114 and the extraordinary signal that travels on the path 112 will be deflected, the amount the signals travelling on the paths 114 and 112 will be deflected may differ. This is because the index of refraction for the ordinary signal, $n_o$, is different from the index of refraction for the extraordinary signal, $n_e$. Furthermore, both will undergo refraction when exiting the birefringent wedge 104. Consequently, the first portion of the optical signal on the path 112 and the second portion of the optical signal on the path 114 will be separated by an angle, δ, after exiting the birefringent wedge 104. In a preferred embodiment, the angle, δ, is given by:

$$\delta = 2 * \arcsin[(n_o - n_e) * \cot(\alpha)]$$

Thus, two relatively small birefringent wedges 102 and 104 are used to split the optical signal input to the splitter/combiner on the path 110. Similarly, the two birefringent wedges 102 and 104 can be used to combine optical signals input to the splitter/combiner on the paths 112 and 114. If two polarized optical signals on the paths 112 and 114 are provided to the splitter/combiner 100, the birefringent wedges 102 and 104 can combine the polarized optical signals on the path 112 and 114 to provide a single optical signal on the path 110. The birefringent wedge 104 combines the optical signals from paths 112 and 114, which are then provided to the first birefringent wedge 102. The first birefringent wedge outputs the combined optical signal on the path 110 in the desired direction.

Thus, the splitter/combiner 100 can split or combine optical signals. Furthermore, the birefringent wedges 102 and 104 are relatively small. The birefringent wedges 102 and 104 thus occupy a relatively small amount of space. In addition, the birefringent wedges 102 and 104 are relatively cheap because of their small size. Consequently, the size and cost of the splitter/combiner 100 are reduced.

FIG. 2B depicts and alternate embodiment of a splitter/combiner 100' in accordance with the present invention. Components of the splitter/combiner 100' are analogous to the splitter combiner 100 and are thus labeled similarly. The birefringent wedges 102' and 104' are separated by a small space, instead of toucing. Both optical paths 112' and 114' exit the birefringent wedge 102' with a nonzero angle of incidence. Thus, since the birefringent wedges 102' and 104' are spaced apart, the paths 112' and 114' diverge after exiting the birefringent wedge 102' for the same reasons as discussed above. In such a case, the paths 112' and 114' may be shifted slightly. The paths 112' and 114' would continue to diverge, as discussed above, as and after passing through the second birefringent wedge 104'. Thus, when the birefringent wedges 102' and 104' are separated by a small space, the splitter/combiner can still function. However, in a preferred embodiment, depicted in FIG. 2A, the birefringent wedges 102 and 104 are not separated by a space.

Figure 3:
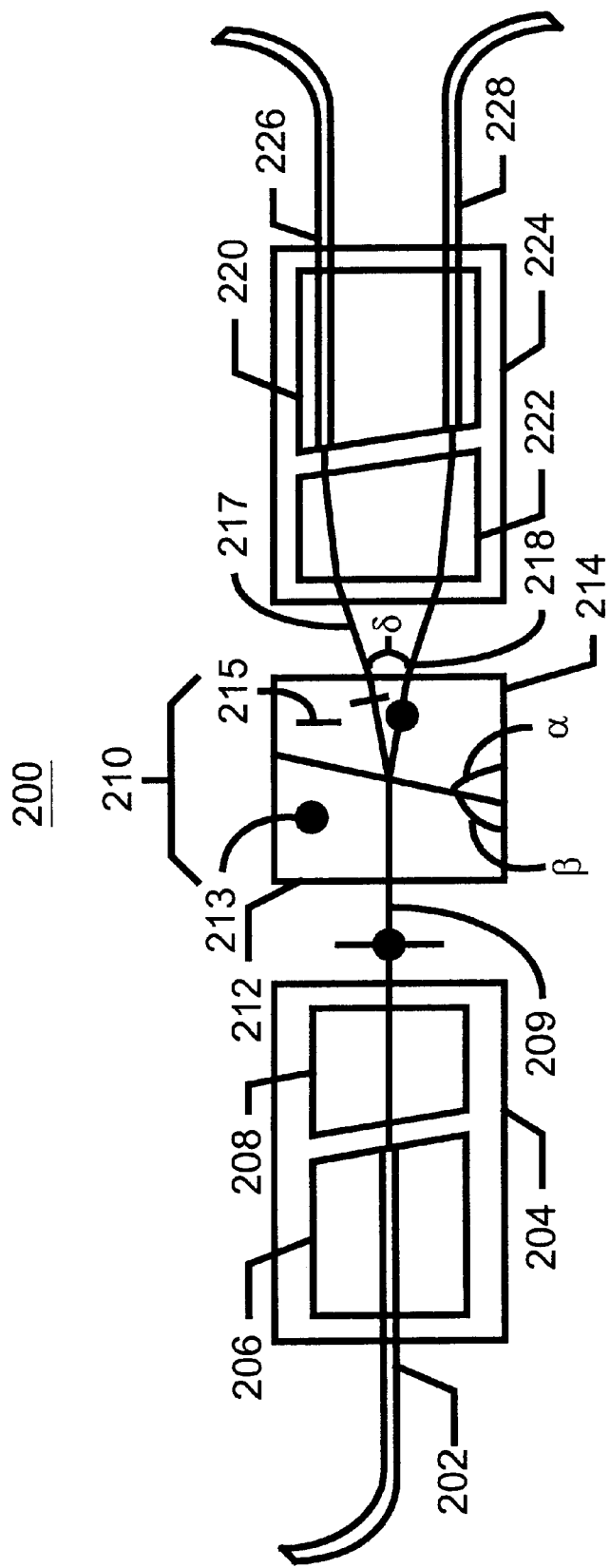
FIG. 3 depicts a side view of one embodiment of a splitter/combiner in accordance with the present invention

FIG. 3 depicts a preferred embodiment of a splitter/combiner 200 in accordance with the present invention. The splitter/combiner 200 includes a first fiber 202 and a collimator 204. The collimator 204 preferably includes a capillary 206 which holds the fiber 202 and a lens 208. The lens 208 is preferably a graduated index of refraction ("GRIN") lens that collimates light from fiber 202. The lens 208 also preferably has a pitch of between .18 and .24. The splitter/combiner 200 also includes a pair 210 of birefringent wedges. The pair 210 of birefringent wedges includes a first birefringent wedge 212 and a second birefringent wedge 214. The first birefringent wedge 212 and the second birefringent wedge 214 are preferably the same as the wedges 102 and 104, respectively, of the splitter/combiner 100 depicted in FIG. 2A. Referring back to FIG. 3, in a preferred embodiment, the birefringent wedges 202 and 204 are in close proximity, as depicted in FIG. 3. However, in an alternate embodiment, the birefringent wedges 202 and 204 can be separated by a small space. The first birefringent wedge 212 has a wedge angle, β, while the second birefringent wedge has a wedge angle, α. The wedge angle β is preferably the complement of the wedge angle α. Furthermore, the optic axis 213 of the first birefringent wedge 212 is perpendicular to the optic axis 215 of the second birefringent wedge 214. The birefringent wedges 212 and 214 are also preferably made of birefringent crystal. The splitter/combiner 200 also includes a second collimator 220 that is coupled with second fiber 226 and third fiber 228. The second collimator 220 preferably includes a lens 222 and a capillary 224. The lens 222 is preferably a GRIN lens and collimates optical signals provided to or from the fibers 226 and 228. The lens 222 also preferably has a pitch of between 0.18 and 0.24. The capillary 224 holds fibers 226 and 228. The fibers 226 and 228 are preferably polarization-maintaining fibers. Thus, optical signals transmitted over the fibers 226 and 228 maintain their polarizations.

Also depicted in FIG. 3 are paths 209, 217 and 218. An optical signal input to the splitter/combiner via fiber 202 travels along the path 209 to the birefringent wedges 212 and 214. The birefringent wedges 212 and 214 split the optical signal such that a first portion having a first polarization travels along the path 217, while a second portion having a second polarization travels along the path 218. Similarly, the wedges 212 and 214 combine polarized optical signals traveling over the paths 217 and 218 to an optical signal traveling over the path 209. Thus, the birefringent wedges 212 and 214 function in a similar manner to the birefringent wedges 102 and 104 depicted in FIG. 2A.

Referring back to FIG. 3, the splitter/combiner 200 thus utilizes the birefringent wedges 212 and 214 to split or combine optical signals based on the polarizations of the optical signals. Consequently, the splitter/combiner 200 has the advantages of the splitter/combiner depicted in FIG. 2A. Referring back to FIG. 3, the splitter/combiner 200 is, therefore, smaller and lower in cost than a conventional splitter/combiner. Furthermore, the splitter/combiner 200 utilizes a single collimator 220 for both of the fibers 226 and 228. Consequently, the number of components used in the splitter/combiner 200 is reduced. As a result, the splitter/combiner 200 occupies even less space and, because a total of only two collimators may be used, is less expensive than a conventional splitter/combiner.

A method and system has been disclosed for providing a splitter/combiner which may have be smaller and be low in cost to manufacture. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A splitter/combiner comprising:
   a first birefringent wedge having a first optic axis and a first wedge angle; and
   a second birefringent wedge having a second optic axis and a second wedge angle, the second birefringent wedge being optically coupled with the first birefringent wedge, the the second wedge angle being complementary to the first wedge angle, the second optic axis being perpendicular to the first optic axis such that an extraordinary signal for the first birefringent wedge is an ordinary signal for the second birefringent wedge,
   the first and second birefringent wedges establishing a first path for a first portion of a first optical signal and for establishing a second path for a second portion of the first optical signal, the first path and the second path being separated by an angle, the first optical signal travelling from the first birefringent wedge to the second birefringent wedge, the first birefringent wedge and the second birefringent wedge for combining a second optical signal travelling along the first path with a third optical signal travelling along the second path, the second optical signal and the third optical signal travelling from the second birefringent wedge to the first birefringent wedge.

2. The splitter/combiner of claim 1 wherein the angle between the first path and the second path is equal to the two times the arcsin of a first quantity, the first quantity being a cotangent of the second wedge angle multiplied by a second quantity, the second quantity being an extraordinary index of refraction minus an ordinary index of refraction for the the second birefringent wedge.

3. The splitter/combiner of claim 1 further comprising:
   a first fiber for receiving the first optical signal; and
   a first collimator between the first fiber and the first birefringent wedge, the first collimator for collimating the first optical signal.

4. The splitter/combiner of claim 3 further comprising:
   a second optical fiber, the second optical fiber being polarization-maintaining and being optically coupled with the first path,
   a third optical fiber, the third optical fiber being polarization-maintaining, the third optical fiber being optically coupled with the second path.

5. The splitter/combiner of claim 4 further comprising:
   a second collimator optically coupled to the second fiber and the third fiber.

6. The splitter/combiner of claim 5 wherein the second collimator further includes:
   a capillary for holding the second fiber and the third fiber; and
   a lens disposed between the second birefringent wedge and the capillary.

7. The splitter/combiner of claim 3 wherein the first collimator further includes:
   a first capillary for holding the first fiber; and
   a lens disposed between the first capillary and the first birefringent wedge.

8. A method for splitting an optical signal comprising the steps of:
   a) providing the optical signal to a pair of birefringent wedges, the birefringent wedges including a first birefringent wedge having a first optic axis and a first wedge angle, and a second birefringent wedge having a second optic axis and a second wedge angle, the second birefringent wedge being optically coupled with the first birefringent wedge, the second wedge angle being complementary to the first wedge angle, the second optic axis being perpendicular to the first optic axis such that an extraordinary signal for the first birefringent wedge is an ordinary signal for the second birefringent wedge; and
   b) establishing a first for a first portion of the optical signal and a second path for a second portion of the optical signal using the first and second birefringent wedges, the first path and the second path being separated by an angle, the optical signal travelling from the first birefringent wedge to the second birefringent wedge.

9. The method of claim 8 wherein the angle between the first path and the second path is equal to two times the arcsin of a first quantity, the first quantity being a cotangent of the second wedge angle multiplied by a second quantity, the second quantity being an extraordinary index of refraction minus an ordinary index of refraction for the second birefringent wedge.

10. The method of claim 8 further comprising the steps of:
    c) providing the optical signal to a first fiber; and
    d) providing the optical signal from the first fiber to a first collimator between the first fiber and the first birefringent wedge, the first collimator for collimating the optical signal.

11. The method of claim 10 further comprising the steps of:
    e) providing the first portion of the optical signal to a second optical fiber, the second optical fiber being polarization-maintaining and being optically coupled with the first path,
    f) providing the second portion of the optical signal to a third optical fiber, the third optical fiber being polarization-maintaining, the third optical fiber being optically coupled with the second path.

12. The method of claim 11 further comprising the step of:
    g) providing the first portion of the optical signal and the second portion of the optical signal to a second collimator optically coupled to the second fiber and the third fiber prior to providing the first portion of the optical signal and the second portion of the optical signal to the third optical fiber and the fourth optical fiber.

13. The method of claim 12 wherein the second collimator further includes:
   a capillary for holding the second fiber and the third fiber; and
   a lens disposed between the second birefringent wedge and the capillary.

14. The method of claim 10 wherein the first collimator further includes:
   a first capillary for holding the first fiber; and
   a lens disposed between the first capillary and the first birefringent wedge.

15. A method for splitting an optical signal comprising the steps of:
   a) providing a first optical signal and a second optical signal to a pair of birefringent wedges, the birefringent wedges including a first birefringent wedge having a first optic axis and a first wedge angle, and a second birefringent wedge having a second optic axis and a second wedge angle, the second birefringent wedge being optically coupled with the first birefringent wedge, the second wedge angle being complementary to the first wedge angle, the second optic axis being perpendicular to the first optic axis such that an extraordinary signal for the first birefringent wedge is an ordinary signal for the second birefringent wedge, the first optical signal being along a first path and the second optical signal being along a second path, the first path and the second path being separated by an angle, the first optical signal travelling from the second birefringent wedge to the first birefringent wedge, the second optical signal travelling from the second birefringent wedge to the first birefringent wedge; and
   b) combining the first and second optical signals using the first birefringent wedge and the second birefringent wedge.

* * * * *